(No Model.)  2 Sheets—Sheet 1.
I. J. GRAY.
HARNESS.
No. 405,771. Patented June 25, 1889.
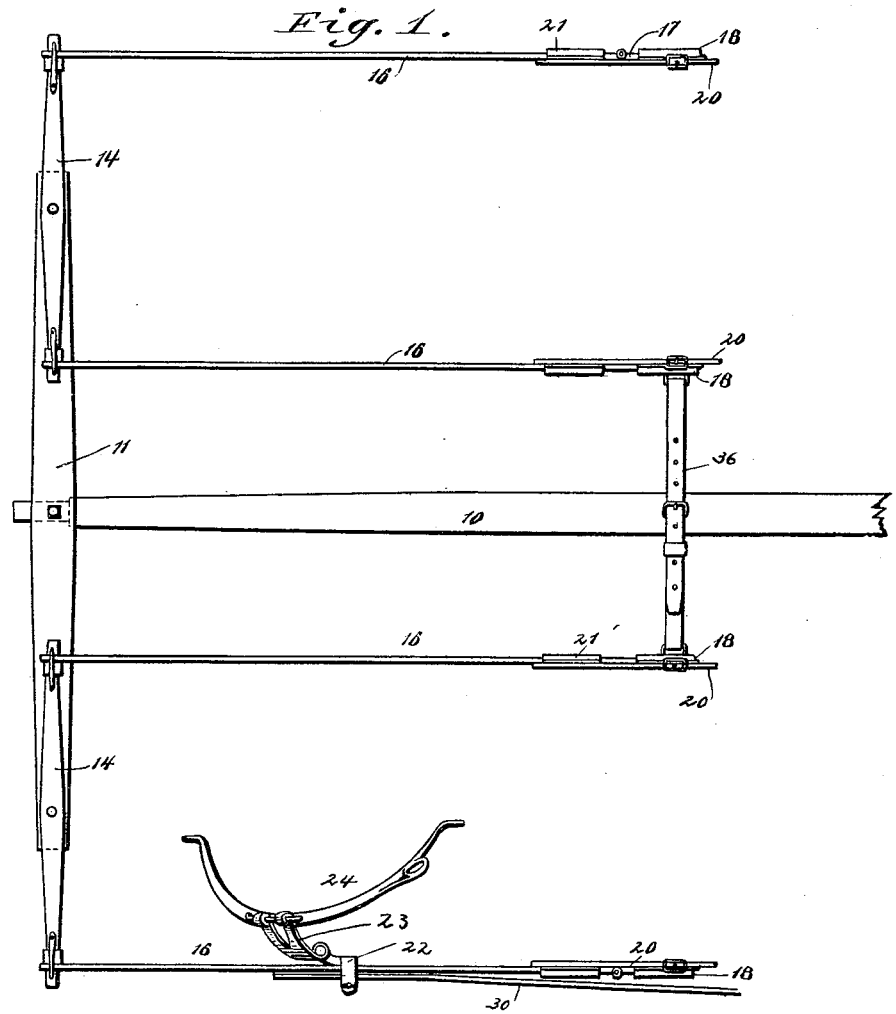
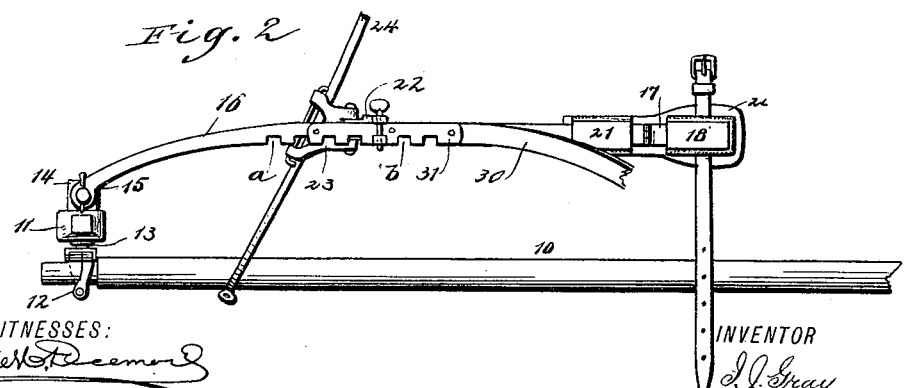
WITNESSES:
INVENTOR
I. J. Gray
BY Munn & Co.
ATTORNEY (No Model.) 2 Sheets—Sheet 2.

I. J. GRAY.
HARNESS.

No. 405,771. Patented June 25, 1889.

WITNESSES:

INVENTOR

BY

ATTORNEY

UNITED STATES PATENT OFFICE.

ISAAC J. GRAY, OF BELOIT, WISCONSIN.

HARNESS.

SPECIFICATION forming part of Letters Patent No. 405,771, dated June 25, 1889.

Application filed February 19, 1889. Serial No. 300,477. (No model.)

*To all whom it may concern:*

Be it known that I, ISAAC J. GRAY, of Beloit, in the county of Rock and State of Wisconsin, have invented a new and Improved Harness, of which the following is a full, clear, and exact description.

This invention relates to harnesses, the object of the invention being to provide a harness by means of which the animal or animals upon which the harness is placed will push instead of pull the vehicle to which they are attached.

To the end named the invention consists, essentially, of a singletree arranged for connection with the thills or pole of the vehicle, and rigid arms arranged for connection with the singletree and with the hames or collar of the harness, said arms being formed with notches to provide for proper adjustment of the harness, all as will be hereinafter more fully described, and specifically pointed out in the claims.

Reference is to be had to the accompanying drawings, forming a part of this specification, in which similar figures and letters of reference indicate corresponding parts in all the views.

Figure 3:
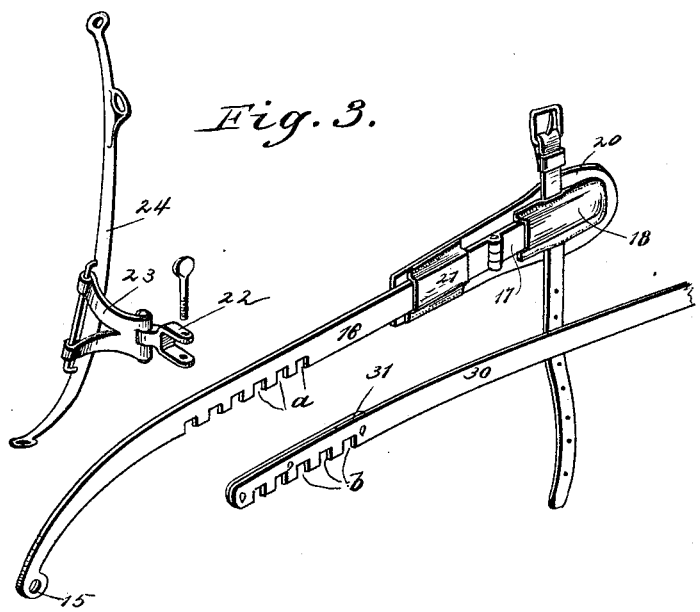
Figure 4:
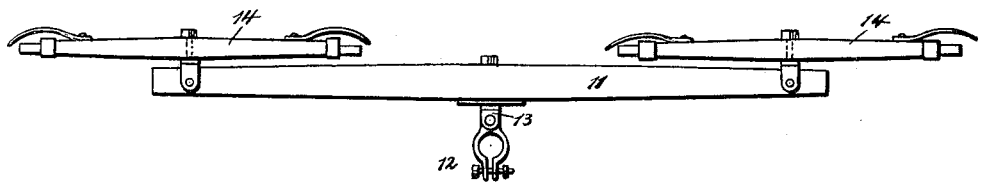
Figure 5:
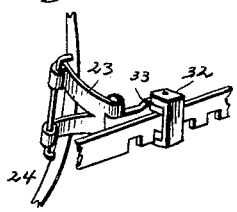
Figure 6:
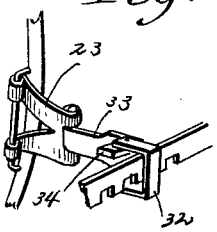
Figure 7:
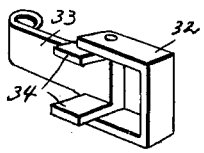

Figure 1 is a plan view of a portion of a double harness constructed in accordance with the terms of my invention. Fig. 2 is a side view thereof. Fig. 3 is a detail perspective view showing one section of a hames, a pusher-bar, and a tug or trace, the parts being disconnected. Fig. 4 is a face view of a doubletree and the singletrees carried thereby, the parts being represented as they appear when removed from the pole. Fig. 5 is a perspective view representing a portion of a hames-section and pusher-bar and a modified form of clamp. Fig. 6 is a similar view representing the parts as they appear when arranged to engage both a pusher-bar and a tug, and Fig. 7 is a perspective view of the clamp.

In the drawings, 10 represents a vehicle-pole; 11, a doubletree that is provided with a shackle 12, connected thereto by a swivel-joint 13. To the ends of the doubletree 11, I connect singletrees 14, the ends of which are shaped to enter eyes 15, formed at the forward ends of pusher-bars 16. To the rear ends of these pusher-bars there are hinged sections 17, which enter housings 18, formed on pads 20, the forward ends of the pads being provided with housings 21, through which the pusher-bars 16 pass.

The under side of the bars 16 are formed with recesses or notches *a*, that are entered by shackles 22, said shackles being pivotally connected to arms 23, that are in turn pivotally connected to the hames-section 24, as shown best in Fig. 3, the shackle being arranged to enter the proper one of the recesses *a* to bring about the required adjustment of the harness.

The tugs 30 are provided with metallic plates 31, and the plates and the tugs are formed with recesses *b*, which correspond with the recesses *a*, said recesses being entered by the shackles 22. The tugs 30 could be secured to the singletrees in the ordinary manner, or could be connected directly to the projection of the harness.

Instead of using shackles such as the one shown in Fig. 3, I could employ clamps such as those shown in Figs. 5, 6, and 7, said clamps consisting of a bow 32, which overlaps the pushers and the tugs, and a tongue 33, that is pivotally connected to the arm 23, this tongue being provided with lugs or projections 34, which enter the recesses *a* and *b*.

The pushers above described—that is, those provided with the rearwardly-extending sections 17—are the outer pushers, and although the inner pushers—that is, those adjacent to the pole 10—might be made in the same way, I prefer to make them in one solid piece, as shown. In order that the horses may be held from traveling too far apart, I connect the inner pushers by a strap 36.

Although I have described my improved harness as arranged for use in connection with a hames-collar, I desire it to be understood that the ordinary form of Dutch collar might be employed, the pushers being connected to the rear ends of the said collar, and although I have described my invention as arranged for use in connection with a double harness, I desire it to be understood that the arrangement could be employed in connection with a single harness, in which case a cross-bar would be connected to the forward end of the thills and a singletree pivotally connected to said cross-bar.

Such a harness as the one above described enables the animal or animals to push instead of draw the vehicle, and consequently their power is applied in the most advantageous manner, and if from carelessness or by accidental breaking the pole of the vehicle becomes disengaged from the doubletree the animals in harness are entirely freed from the vehicle, so that should they run away they cannot drag the vehicle after them, to the peril of human life.

Having thus described my invention, I claim as new and desire to secure by Letters Patent—

1. In a harness, rigid parallel pusher-bars 16, having singletree-connections at their front ends, straps at their rear ends to pass around the body of the animal, and means for connecting the bars between their ends to a collar, substantially as set forth.

2. The combination, with two pairs of rigid pusher-bars 16, adapted for connection at their front ends with singletrees and of a length sufficient to extend along the sides of the animal, and a connection, as 36, between the rear ends of the inner bars, of a pair of hames between each pair of bars, one member of each pair having a hinged connection with one of said bars between its ends, substantially as set forth.

3. The combination, with two parallel rigid pusher-bars between which the animal is held, adapted at their front ends for connection with a singletree, of hames having opposite rearwardly-extending hinged arms 23 detachably connected to said bars between their ends, substantially as set forth.

4. The combination, with the parallel pusher-bars having notched edges in rear of their front ends, said ends being adapted for connection with a singletree, of hames having rearward-extending hinged arms provided with hinged connections engaging the notches of the bars, substantially as set forth.

5. The combination, with the hames, of the hinged arms 23, tongues 33, hinged to the outer ends thereof and provided with lugs 34, and bows 32, hinged to the tongues to swing over said lugs, substantially as set forth.

6. In a harness, a rigid pusher-bar adapted for connection with a singletree at its front end, provided with notches 23, a hinged section 17 at its rear end, and a pad having housing 18 21, substantially as set forth.

7. The combination, with the notched pusher-bars 16, adapted for connection with a singletree at their front ends and notched in rear thereof, and the tugs 30, having a notched plate 31 at their front ends, the notches of which register with those of the pusher-bars, of hames having hinged connections connecting them with the notched bars and the notched plates, substantially as set forth.

ISAAC J. GRAY.

Witnesses:
J. B. DOW,
C. D. HARRIS.